United States Patent
Chien et al.

(10) Patent No.: US 11,942,649 B2
(45) Date of Patent: Mar. 26, 2024

(54) BATTERY MOUNTING USING A HEAT TREATED ADHESIVE

(71) Applicant: Apple Inc., Cupertino, CA (US)

(72) Inventors: Joshua M. Chien, San Francisco, CA (US); Srinath D. Chandrashekarpur, San Jose, CA (US); Rajesh Kandibanda, San Jose, CA (US); Nathan J. Bohney, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 483 days.

(21) Appl. No.: 15/910,283

(22) Filed: Mar. 2, 2018

(65) Prior Publication Data

US 2019/0081291 A1 Mar. 14, 2019

Related U.S. Application Data

(60) Provisional application No. 62/556,730, filed on Sep. 11, 2017.

(51) Int. Cl.
*H01M 10/02* (2006.01)
*H01M 50/209* (2021.01)

(52) U.S. Cl.
CPC ...... *H01M 50/209* (2021.01); *H01M 2220/30* (2013.01)

(58) Field of Classification Search
CPC .................. H01M 2/1066; H01M 2220/30
See application file for complete search history.

(56) References Cited

U.S. PATENT DOCUMENTS

| 5,741,609 | A | * | 4/1998 | Chen | H01M 2/1673 |
| | | | | | 29/623.4 |
| 6,063,521 | A | * | 5/2000 | Deslyper | H01M 2/1022 |
| | | | | | 429/100 |
| 2008/0241663 | A1 | | 10/2008 | Yamashita et al. | |
| 2012/0068551 | A1 | * | 3/2012 | Pooley | H01M 2/021 |
| | | | | | 307/104 |
| 2013/0045397 | A1 | * | 2/2013 | Pyo | H01M 2/1061 |
| | | | | | 429/7 |

(Continued)

FOREIGN PATENT DOCUMENTS

EP  3091590  11/2016
JP  2011-054563  3/2011

(Continued)

OTHER PUBLICATIONS

Nikafshar et al., "The Effects of UV Light on the Chemical and Mechanical Properties of a Transparent Epoxy-Diamine System in the Presence of an Organic UV Absorber," *Materials*, 2017, vol. 10, No. 180, 18 pages.

*Primary Examiner* — Cynthia K Walls
(74) *Attorney, Agent, or Firm* — BakerHostetler (57) ABSTRACT

The disclosed technology relates to battery pack that includes a first prismatic cell having a first surface, and a second prismatic cell having a second surface, wherein the first prismatic cell and the second prismatic cell are electrically coupled and arranged such that the first surface and the second surface form an L-shaped pack surface. In some aspects, the battery pack includes an adhesive that is disposed on the pack surface away from a junction between the first surface and the second surface. A battery-powered electronic device and method of manufacture are also provided.

24 Claims, 5 Drawing Sheets

(56) References Cited

U.S. PATENT DOCUMENTS

| | | | |
|---|---|---|---|
| 2015/0004442 A1* | 1/2015 | Saxe ..................... | H01G 9/04 |
| | | | 429/8 |
| 2018/0183117 A1* | 6/2018 | Cho ..................... | H01M 2/10 |
| 2019/0097185 A1 | 3/2019 | Malgioglio et al. | |

FOREIGN PATENT DOCUMENTS

| | | | | |
|---|---|---|---|---|
| KR | 10-1699846 | | 1/2017 | |
| WO | WO-2016/200231 | * | 12/2016 | ........ H01M 10/6551 |

* cited by examiner

BATTERY MOUNTING USING A HEAT TREATED ADHESIVE

PRIORITY

This application claims the benefit under 35 U.S.C. § 119(e) of U.S. Provisional Patent Application Ser. No. 62/556,730, entitled "BATTERY MOUNTING USING A HEAT TREATED ADHESIVE," filed on Sep. 11, 2017, which is incorporated herein by reference in its entirety.

TECHNICAL FIELD

The present disclosure relates generally to battery packs, and more particularly, to the use of a heat-treated adhesive for securing a battery pack within a battery-powered electronic device.

BACKGROUND

Battery cells are used to provide power to a wide variety of portable electronic devices, including laptop computers, tablet computers, smart phones, personal digital assistants (PDAs), digital music players, watches, and wearable devices. A commonly used type of battery is a lithium battery, which can include a lithium-ion or a lithium-polymer battery. In some applications, where greater charge storage is desired, multiple battery cells can be coupled to form battery packs of increased storage capacity.

Battery packs for portable electronic devices are often adhered to an interior of the device enclosure. In such arrangements, battery packs are conventionally fastened to the device chassis, for example, using an adhesive that is disposed over an entirety of at least one side of the pack surface.

SUMMARY

The disclosed embodiments provide a battery pack with a reduced adhesive area for securing the battery pack to an internal device enclosure, such as a device chassis. In some aspects, battery pack includes a first prismatic cell having a first surface, and a second prismatic cell having a second surface. The first prismatic cell and second prismatic cell are electrically coupled and arranged such that the first surface and second surface form an L-shaped pack surface. An adhesive is disposed on the pack surface away from a junction formed between the first surface and the second surface.

In some embodiments, the pack surface is planar and the adhesive is disposed on the pack surface in a pattern that forms a circumferential arc around the junction between the first surface and the second surface. The adhesive can be disposed on the pack surface such that a center of the L-shaped pack surface remains adhesive-free. In some embodiments, the adhesive can include an acrylic polymer adhesive that contains a polyurethane core substrate.

In some embodiments, the adhesive is disposed on less than 100 percent of a total area of the pack surface. For example, the adhesive may be disposed on less than 50 percent of a total area of the pack surface. Adhesive coverage can vary between prismatic cells in the pack. For example, the adhesive can cover less than 30 percent of the first surface of the first prismatic cell, and less than 50 percent of the second surface of the second prismatic cell.

In some embodiments, the adhesive can adhere the battery pack to an interior of a battery-powered electronic device with a peel strength of at least 8 N/cm. The adhesive, when adhering the battery pack to an interior of a battery-powered electronic device, can provide an impact resistance of at least 0.80 Joules. In other embodiments, the adhesive can adhere the battery pack to an interior of the electronic device with a peel strength of at least 10 N/cm, and can provide an impact resistance of at least 1.0 Joules.

In another embodiment, the disclosed technology encompasses a battery-powered electronic device that includes a chassis configured to enclose a battery pack. The battery pack inside the chassis includes a first prismatic cell having a first surface, and a second prismatic cell having a second surface. The first prismatic cell and the second prismatic cell are electrically coupled and arranged such that the first surface and the second surface form an L-shaped pack surface. In some embodiments, an adhesive is disposed on the pack surface away from a junction between the first surface and the second surface.

In yet another embodiment, the subject technology encompasses a method for manufacturing a battery pack. The method includes steps for coupling a first prismatic cell with a second prismatic cell such that a first surface of the first prismatic cell and a second surface of the second prismatic cell are arranged to form an L-shaped pack surface. In some aspects, the method can further include a step for disposing an adhesive on the pack surface away from a junction between the first surface and the second surface.

BRIEF DESCRIPTION OF THE DRAWINGS

The embodiments disclosed herein may be better understood by referring to the following description in conjunction with the accompanying drawings in which like reference numerals indicate identical or functionally similar elements. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the technology.

Battery-powered electronic devices often contain battery packs made up of multiple, electrically coupled, battery cells. In some devices, prismatic cells of a lithium-ion or a lithium-polymer type are used to provide power to the enclosing device. Conventionally, individual prismatic cells are bounded by flat surfaces (e.g., in a rectangular shape) and secured with an adhesive that covers an entirety of at least one surface. However, efforts to reduce device sizes are making it increasingly difficult to provide adhesive layers disposed over an entirety of the pack surface.

Aspects of the subject technology address the foregoing problems by providing a battery pack configured with an adhesive disposed over only a portion of the pack surface. Reductions in adhesive area can be facilitated through the use of a heat-treated adhesive, which greatly improves certain adhesion characteristics, such as impact resistance.

A battery pack of the disclosed technology can include multiple prismatic cells that are coupled in a non-rectangular configuration, such as an L-shaped configuration, in which adhesive layering is disposed on a substantially reduced area, as compared to conventional adhesive layouts. Although different adhesive types can be used, in some implementations, a heat-treated acrylic polymer adhesive containing a polyurethane core substrate is used. While such adhesives can provide reduced peel strength when compared to other adhesive types, heat treatment can be used to increase peel strength and impact resistance, making heat-treated acrylic polymer adhesives with a polyurethane core substrate desirable for use in applications where device dropping or jarring is common.

Figure 1:
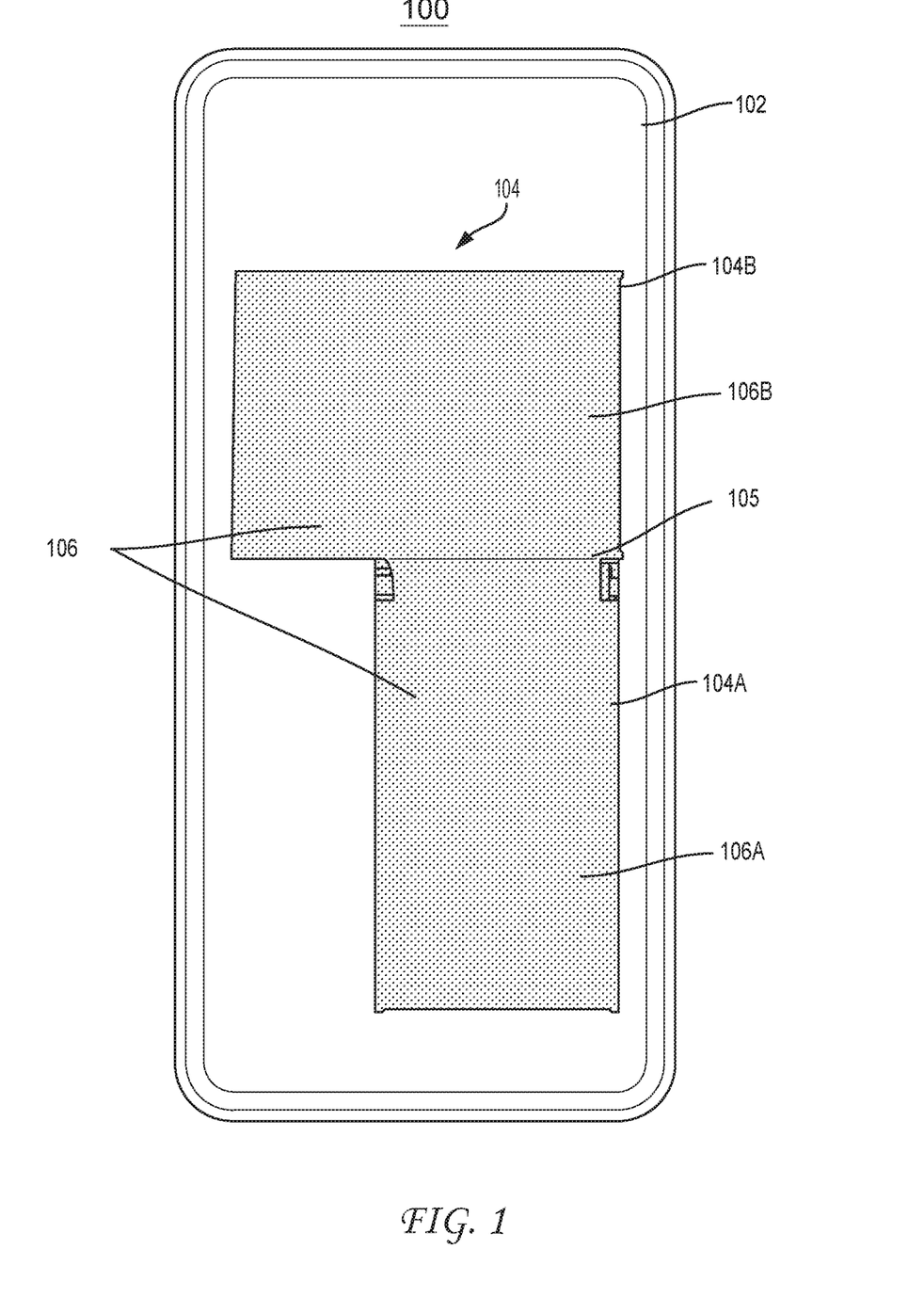
FIG. 1 illustrates a top-perspective view of an example battery-powered electronic device, including a battery pack of the subject technology.

FIG. 1 illustrates a top-perspective view of a battery-powered electronic device 100 that includes an exposed battery pack 104 of the subject technology. Battery pack 104 is disposed within battery-powered electronic device 100 by adhesion to a chassis 102 of the device 100, for example, using an adhesive disposed on a bottom surface of battery pack 104 (not shown). Battery pack 104 is formed from the electrical and mechanical coupling of multiple battery cells, i.e., a first cell 104A, and a second cell 104B, that are adjoined along junction 105.

In battery-powered electronic device 100, first cell 104A and second cell 104B are prismatic cells contained within respective pouches, each having a substantially planar surface, i.e., first pack surface 106A and second pack surface 106B, respectively. First cell 104A and second cell 104B are arranged such that the coupling of first pack surface 106A and second pack surface 106B forms an L-shaped top pack surface 106. However, first cell 104A and second cell 104B may be coupled in other arrangements, without departing from the scope of the technology. As discussed above, an adhesive disposed on a bottom side of pack surface 106 can be used to secure battery pack 104 to the inside of device 100, such as, to a portion of chassis 102. Additionally, it is understood that the illustrated orientation of battery pack 104 is provided as an example of one possible battery configuration; however, battery pack 104 may be secured in other orientations within electronic device 100, without departing from the scope of the technology. For example, battery pack 104 may be positioned such that second cell 104B is placed in a lower portion of electronic device 100, as oriented in the illustration of FIG. 1.

Figure 2:
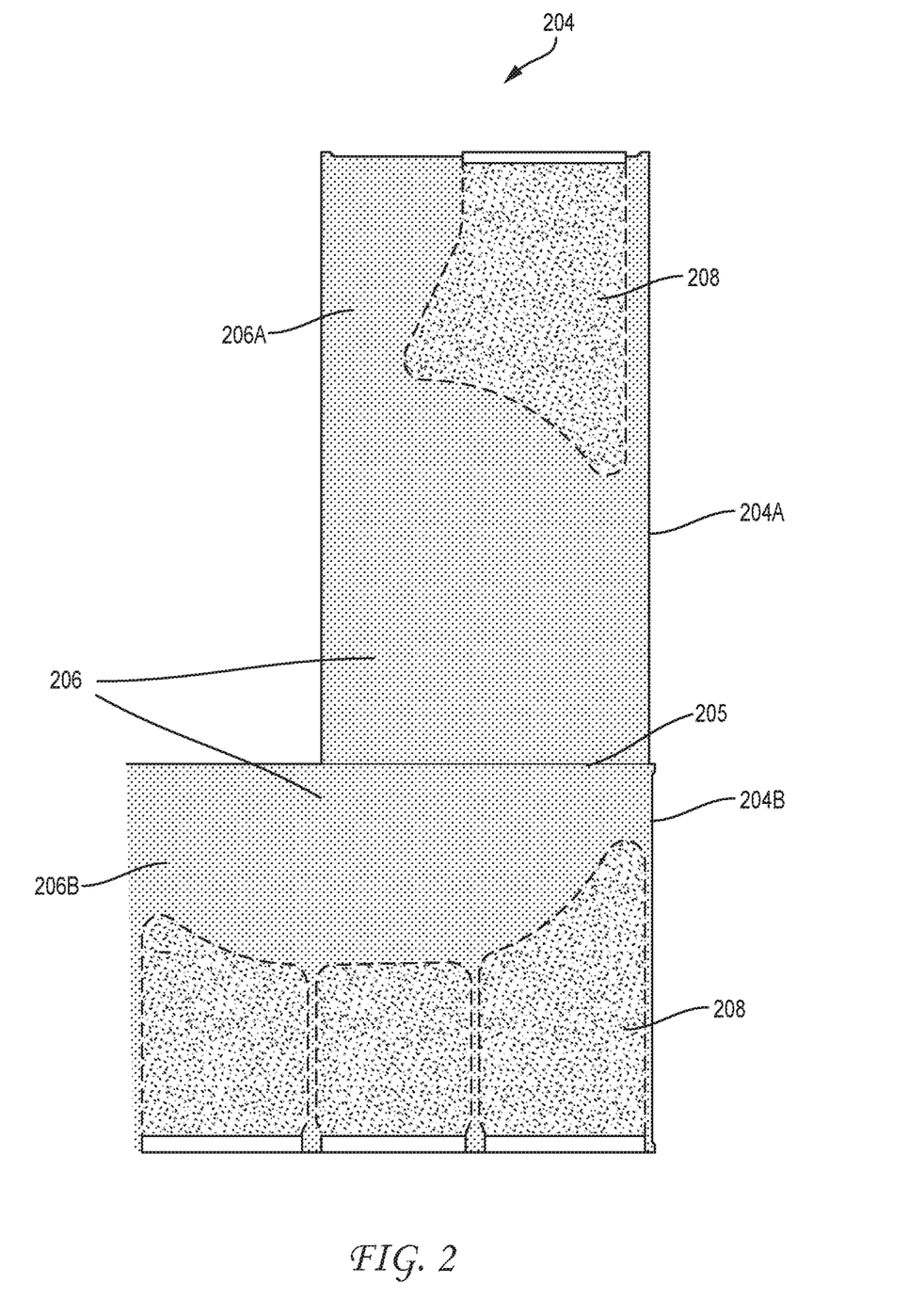
FIG. 2 illustrates a bottom-perspective view of an example battery pack, including an adhesive disposed thereon, according to some aspects of the technology.

FIG. 2 illustrates an example of a bottom perspective view of a battery pack 204, according to some aspects of the technology. Battery pack 204 is formed from the electrical and mechanical coupling of a first prismatic cell 204A, having a first surface 206A, and a second prismatic cell 204B, having a second surface 206B. Pack surface 206 is formed by the adjacent arrangement of first surface 206A and second surface 206B, and contains an adhesive 208 disposed thereon Similar to top pack surface 106, discussed above, pack surface 206 is a planar L-shape formed from the mechanical coupling of first surface 206A (e.g., representing a bottom side of a first prismatic cell, such as 104A), and second surface 206B (e.g., representing a bottom side of a second prismatic cell, such as 104B). The coupling of first surface 206A and second surface 206B forms a junction 205.

Adhesive 208 is disposed on a portion of pack surface 206. In some preferred embodiments, adhesive 208 is disposed on substantially less than an entire surface area of pack surface 206. For example, adhesive 208 may be disposed on less than 75 percent of pack surface 206. In another aspect, adhesive 208 may be disposed on less than 50 percent of pack surface 206. In yet another aspect, adhesive 208 may be disposed on less than 40 percent of pack surface 206.

Relative coverage areas of adhesive 208 can vary from cell-to-cell within battery pack 204. In some implementations, adhesive 208 may cover between 300 mm$^2$ and 550 mm$^2$ of first surface 206A, and between 800 mm$^2$ and 1050 mm$^2$ of second surface 206B. In another aspect, adhesive 208 may cover between 400 mm$^2$ and 500 mm$^2$ of first surface 206A, and between 850 mm$^2$ and 950 mm$^2$ of second surface 206B. For example, adhesive 208 may cover less than 476 mm$^2$ of first surface 206A, and less than 941 mm$^2$ of second surface 206B. Relative ratios of cell surface area and adhesive coverage can also vary from cell-to-cell. For example, adhesive 208 may cover a greater proportion of second surface 206B relative to first surface 206A. By way of example, adhesive 208 may cover less than 30 percent of a total area of first surface 206A, and less than 50 percent of a total area of second surface 206B. In some aspects, adhesive 208 may cover approximately 26 percent of first surface 206A, and approximately 46 percent of second surface 206B.

Adhesive 208 can be disposed in a pattern that leaves a center portion of the L-shaped pack surface 206 substantially adhesive-free. By way of example, adhesive 208 can be disposed along a circumferential arc around junction 205, between first surface 206A and second surface 206B. In some applications, a circumferential pattern of adhesive 208 can leave adhesive-free space necessary to accommodate the placement of components and parts within an enclosure of the battery-powered electronic device.

A circumferential arc pattern of adhesive 208 formed around junction 205 can help to accommodate one or more subsystems, such as an inductive charging subsystem that abuts, or is disposed proximate to, pack surface 206. Adhesive 208 can also be disposed in a configuration that accommodates electrical wires or other conductive components that are used to support one or more subsystems. For example, adhesive 208 can be configured in a pattern that accommodates receiving coil structures used to implement an inductive charging subsystem. By way of example, adhesive 208 can be disposed on first surface 206A, such that adhesive-free portions of first surface 206A accommodate a receiving coil structure used in conjunction with an inductive charging system. In some aspects, the receiving coil may be a ferrite structure that directs magnetic waves to facilitate inductive charging of battery pack 204 and optionally, in conjunction with shielding material such as electric and/or thermal shielding materials, mitigates the transfer of heat and/or magnetic waves into battery pack 204.

It is understood that various patterns and coverage areas for adhesive 208 can be implemented without departing from the technology. Additionally, adhesive 208 may include different adhesive types. By way of example, adhesive 208 may be an acrylic polymer adhesive that contains a polyurethane core substrate, such as a Tesa® 67215 type adhesive. As discussed in further detail below, some adhesives, such as the Tesa® 67215 may be heat and/or pressure treated to alter adhesive characteristics, such as peel strength and/or impact resistance.

In some approaches, a Tesa® 67215 type adhesive may be selected for adhesive 208, despite having a lower peel strength compared to other adhesives, such as the Tesa® 70415. Through heat and/or pressure treated application of Tesa® 67215, the impact resistance of adhesive 208, when applied to the pack surface, can exceed that of other non-polyurethane core substrate adhesives. By way of example, adhesive 208 can provide an impact resistance of at least 0.80 Joules. In some instances, treated applications of adhesive 208 can yield an impact resistance of greater than 1.0 Joules.

Additionally, in some applications, the Tesa® 67215 adhesive layer is thinner, as compared with the Tesa® 70415, which can translate into a lower peel performance for the Tesa® 67215. However, the performance gains achieved in impact resistance through heat and/or pressure treatment of the Tesa® 67215 can make it a good candidate for battery adhesion implementations of the described technology.

It is understood that adhesion strength can vary by adhesive, as well as the bonded material. For example, an untreated Tesa® 67215 adhesive provides a peel strength of approximately 9.5 N/cm when bonded to steel, 6.0 N/cm for aluminum, 7.0 N/cm for magnesium, and 6.0 N/cm for polyethylene. It is understood that adhesion properties such as peel strength and impact resistance can be altered through heat and/or pressure treatments, as discussed above.

Figure 3:
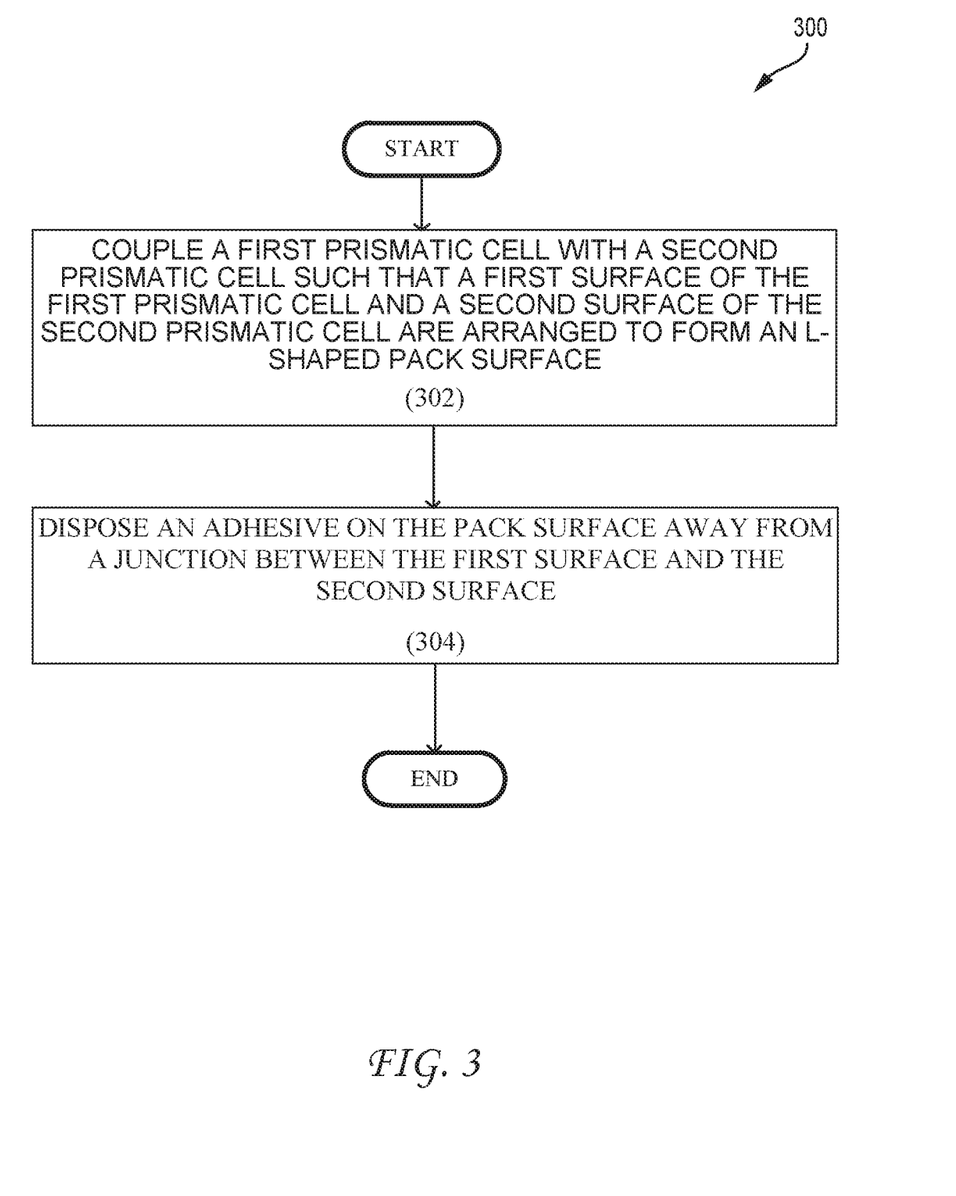
FIG. 3 illustrates an example process for manufacturing a battery pack, according to some aspects of the technology.

FIG. 3 illustrates an example process 300 for manufacturing a battery pack. Process 300 begins with step 302 in which a first prismatic cell is coupled with a second prismatic cell to form an L-shaped pack surface. As discussed above, the pack surface can be formed from the mechanical coupling of a first surface of the first prismatic cell with a second surface of the second surface. As such, the pack surface can be substantially flat (planar), forming a junction at a contact point between the first and second surfaces.

In practice, the first prismatic cell and second prismatic cell are also electrically coupled, forming a battery pack of increased charge capacity. Although the first prismatic cell and second prismatic cell may be of similar sizes (e.g., having substantially similar volume and surface area measurements), in some implementations the cells are different sizes.

Additionally, although L-shaped arrangements between the first prismatic cell and the second prismatic cell are contemplated, other configurations can be implemented without departing from the technology. For example, the first and second prismatic cells may be coupled in a non-rectangular and/or asymmetrical configuration, without departing from the technology. For example, the first surface of the first prismatic cell and the second surface of the second prismatic cell form a non-rectangular pack surface, with the adhesive disposed on the pack away from a junction between the first surface and second surface.

In step 304, an adhesive is disposed on the pack surface, away from the junction between the first surface and the second surface. As discussed above, the adhesive can be disposed on a fractional portion of the total surface area of the pack surface. Additionally, the adhesive coverage can vary for each cell.

By way of example, adhesive coverage may be less than 50 percent of a total surface area of the pack surface. In some embodiments, the adhesive coverage may be less than 40 percent of a total surface area of the pack surface. It is understood that greater (or smaller) coverage areas are contemplated, without departing from the technology.

By way of further example, adhesive coverage for the first prismatic cell and the second prismatic cell can vary, depending on implementation. In one embodiment, the adhesive may be disposed on less than 30 percent of the first surface of the first prismatic cell, and less than 50 percent of the second surface of the second prismatic cell. In another embodiment, the adhesive may be disposed on approximately 26 percent of the first surface of the first prismatic cell, and approximately 46 percent of the second surface of the second prismatic cell.

As discussed above, relative coverage areas of the adhesive can vary from cell-to-cell. For example, the adhesive may cover less than 500 mm$^2$ of the first surface of the first prismatic cell, and less than 1000 mm$^2$ of the second surface of the second prismatic cell. In another example, the adhesive may cover less than 476 mm$^2$ of the first surface of the first prismatic cell, and less than 941 mm$^2$ of the second surface of the second prismatic cell.

Additionally, the adhesive disposed on the pack surface can be of different adhesive types. As discussed above, acrylic polymer adhesives including a polyurethane core substrate can be used. Such adhesive compositions are known to have properties, such as impact resistance, that are enhanced through treatment after application to the battery pack. By way of example, heat and/or pressure treatments may be used to improve impact resistance of a polyurethane core substrate, such as the Tesa® 67215 adhesive. As understood by those of skill in the art, Tesa® adhesives can be desirable for certain applications because of their stretch release property, in which, in a relaxed and bonded state, the adhesion is high. However, placement of force on the adhesive in the lateral direction (orthogonal to the bonding) causes the adhesive molecules re-arrange in an ordered fashion such that to bond is "released."

Figure 4A:
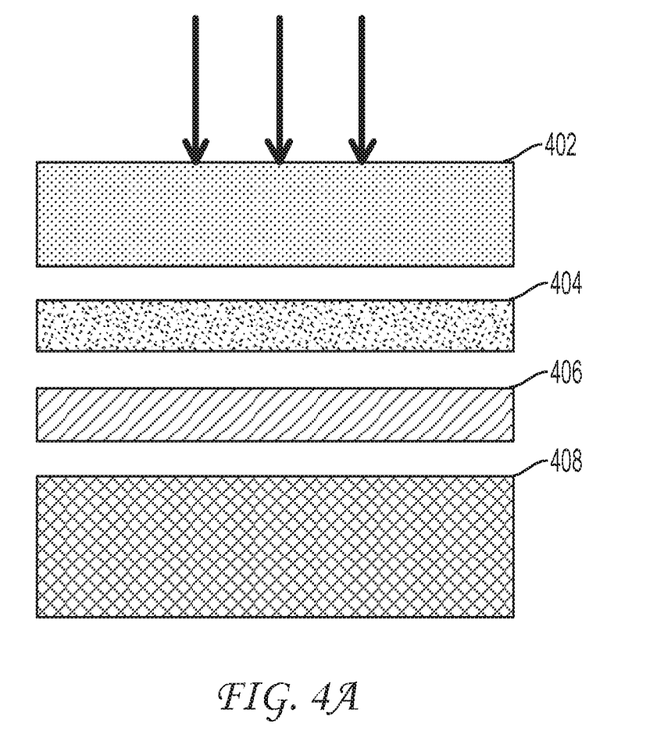
FIG. 4A conceptually illustrates a side-perspective view of components used to provide heat-treatment to an adhesive layer disposed on a battery pack, according to some aspects of the technology.

FIG. 4A conceptually illustrates a side-perspective view of components used to provide heat and pressure necessary to treat an adhesive disposed on a battery pack surface. In the example of FIG. 4A, a battery pack 402 is placed above a very high bond (VHB) adhesive 404, which in turn, is disposed above a base liner 406, and positioned above a heater plate 408.

The (VHB) adhesive 404 is treated on the bottom surface of battery pack 402, when a downward pressure is applied from a top surface of battery pack 402. Concurrently, heat treatment is also accomplished using heat provided by heater plate 408, through base liner 406, onto adhesive 404 disposed on a bottom surface of battery pack 402.

Although different temperature and force combinations can be used to treat adhesive 404 on battery pack 402, in some aspects, a force between approximately 0.10 MPa and 0.30 MPa can be applied in conjunction with a temperature between approximately 45° C. and 55° C. In some aspects, a force between approximately 0.15 MPa and 0.25 MPa can be applied in conjunction with a temperature between approximately 48° C. and 52° C. In such approaches, temperatures can be measured from a "glue line" formed between adhesive 404 and battery pack 402. A duration for force and/or temperature treatments can also vary depending on implementation. In some aspects, heat and force may be applied in treatment of the battery pack adhesive for less than 35 seconds. In other aspects, the head and force application may be applied for less than 20 seconds. As understood by those of skill in the art, battery cell performance can be degraded by excessive heat exposure. As such, adhesive treatment temperatures, and treatment durations may be selected to minimize heat transfer into cells of the battery pack.

As discussed in further detail below with respect to FIG. 4B, force and temperature applications can be controlled using closed-loop control systems that provide force and temperature adjustments in response to real-time measures of force and glue line temperature applied during manufacture.

Figure 4B:
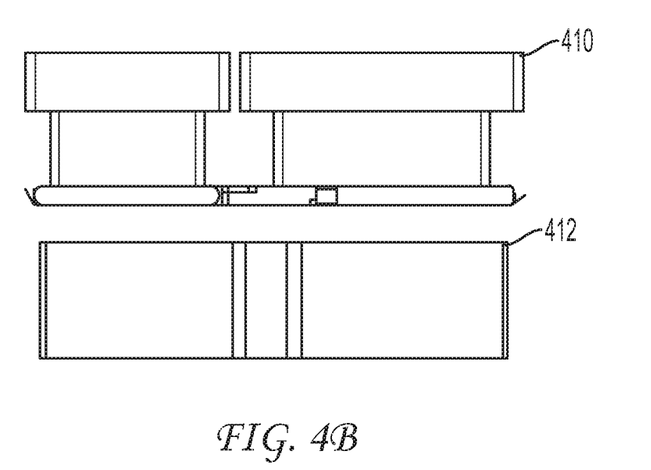
FIG. 4B illustrates a side perspective view of press heads that can be used to apply varying amounts of force and heat to manufacture a battery pack, according to some aspects of the technology.

In particular, FIG. 4B illustrates a side perspective view of press heads 410 and 412 that can be used to apply varying amounts of force and heat necessary to treat a battery pack adhesive, such as adhesive 404, discussed above. The geometry of press heads 410 and 412 can vary depending on implementation, however, in some embodiments, the surface of press heads 410 and 412 can be configured in an L-shape to accommodate the loading, heading, pressing and unloading of an L-shaped battery pack, as described above with respect to FIGS. 1-3.

Actuation of force applied by press head 410 can be controlled by a closed-loop control system, such as a servo-actuation mechanism (not shown). Heat control provided by (lower) press head 412, can be controlled by a closed-loop thermocouple system, for example, to ensure that glue line temperatures meet required thresholds, without dissipating excess heat that could degrade battery cell performance.

Figure 5:
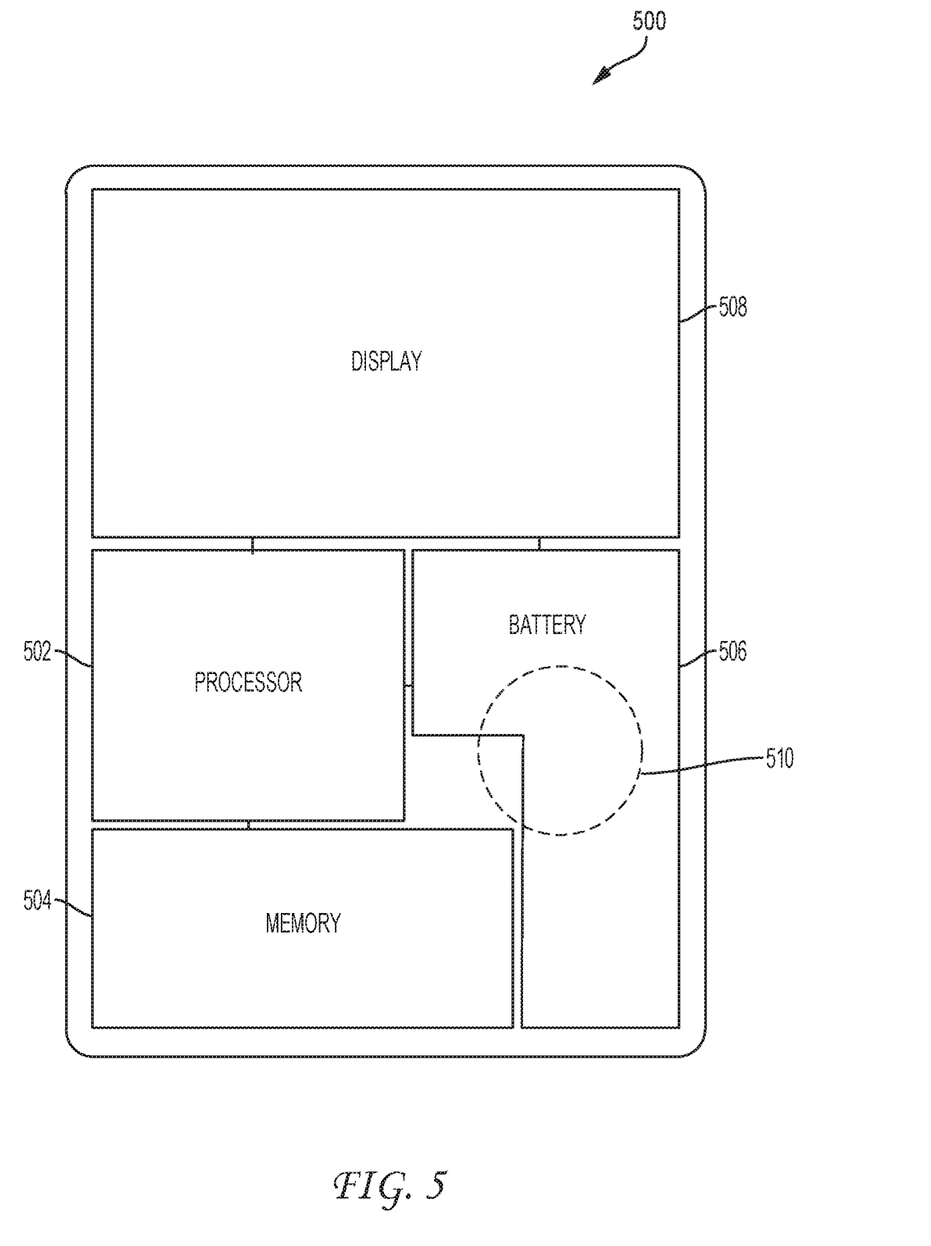
FIG. 5 illustrates a portable electronic device, in accordance with various aspects of the subject technology.

FIG. 5 illustrates a portable electronic device 500, including a battery pack 506, in accordance with various aspects of the described technology. Battery pack 506 can generally be used in any type of electronic device. For example, FIG. 5 illustrates a portable electronic device 500 that includes a processor 502, a memory 504 and a display 508, which are all powered by battery pack 506.

In some aspects, electronic device 500 further includes an inductive charging subsystem 510 that is electrically coupled to battery pack 506, and configured to facilitate wireless charging of battery pack 506, for example, via an inductive charging station (not illustrated). Although inductive charging subsystem 510 is illustrated as being positioned beneath battery pack 506 (e.g., abutting a bottom surface of battery pack 506), it is understood that in inductive charging subsystem could be placed in other locations in device 500, without departing from the technology.

In some aspects, inductive charging subsystem 510 can receive electric charge using a receiving coil structure (not illustrated). For example, the receiving coil may be a ferrite structure configured to direct magnetic waves received from an inductive charging station in order to provide electric charge to battery pack 506. In some aspects, inductive charging subsystem 510, and the supporting receiving coils and cables may be used in conjunction with shielding materials, such as electric and/or thermal shielding materials that mitigate the transfer of heat and/or magnetic waves into battery pack 506.

Electronic device 500 can correspond to a laptop computer, tablet computer, mobile phone, personal digital assistant (PDA), digital music player, watch, wearable device, and/or other type of battery-powered electronic device.

Battery 506 may correspond to a battery pack that includes one or more battery cells, such as first and second prismatic cells, as discussed above.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

It is understood that any specific order or hierarchy of steps in the processes disclosed is an illustration of exemplary approaches. Based upon design preferences, it is understood that the specific order or hierarchy of steps in the processes may be rearranged, or that only a portion of the illustrated steps be performed. Some of the steps may be performed simultaneously. For example, in certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

What is claimed is:

1. A battery pack comprising:
a first prismatic cell comprising a first surface;
a second prismatic cell comprising a second surface, wherein the first prismatic cell and the second prismatic cell are electrically coupled and arranged such that the first surface and the second surface form an L-shaped pack surface; and an adhesive disposed on the L-shaped pack surface away from a junction between the first surface and the second surface;

wherein the adhesive secures the first prismatic cell and the second prismatic cell directly to a chassis of a portable device.

2. The battery pack of claim 1, wherein the pack surface is planar and wherein the adhesive is disposed along a circumferential arc around the junction between the first surface and the second surface.

3. The battery pack of claim 1, wherein a center portion of the L-shaped pack surface remains adhesive-free.

4. The battery pack of claim 1, wherein the adhesive is an acrylic polymer adhesive comprising a polyurethane core substrate.

5. The battery pack of claim 1, wherein the adhesive is disposed on less than 50 percent of a surface area of the pack surface.

6. The battery pack of claim 1, wherein the adhesive disposed on the pack surface covers less than 30 percent of the first surface of the first prismatic cell.

7. The battery pack of claim 1, wherein the adhesive disposed on the pack surface covers less than 50 percent of the second surface of the second prismatic cell.

8. The battery pack of claim 1, wherein the adhesive, when adhering the battery pack to an interior of a battery-powered electronic device, provides a peel strength of at least 8 N/cm.

9. The battery pack of claim 1, wherein the adhesive, when adhering the battery pack to an interior of a battery-powered electronic device, provides an impact resistance of at least 0.80 Joules.

10. A battery-powered electronic device, comprising:
a chassis configured to enclose a battery pack; and
a battery pack disposed within the chassis, the battery pack comprising:
a first prismatic cell comprising a first surface;
a second prismatic cell comprising a second surface, wherein the first prismatic cell and the second prismatic cell are electrically coupled and arranged such that the first surface and the second surface form an L-shaped pack surface; and
an adhesive disposed on the L-shaped pack surface away from a junction between the first surface and the second surface,
wherein the adhesive secures the first prismatic cell and the second prismatic cell directly to an interior of the chassis.

11. The battery-powered electronic device of claim 10, wherein the pack surface is planar and wherein the adhesive is disposed along a circumferential arc around the junction between the first surface and the second surface.

12. The battery-powered electronic device of claim 10, wherein a center of the L-shaped pack surface remains adhesive-free.

13. The battery-powered electronic device of claim 12, wherein the center of the L-shaped pack surface is configured to abut an inductive charging system.

14. The battery-powered electronic device of claim 10, wherein the adhesive is an acrylic polymer adhesive comprising a polyurethane core substrate.

15. The battery-powered electronic device of claim 10, wherein the adhesive is disposed on less than 50 percent of a surface area of the pack surface.

16. The battery-powered electronic device of claim 10, wherein the adhesive disposed on the pack surface covers less than 30 percent of the first surface of the first prismatic cell.

17. The battery-powered electronic device of claim 10, wherein the adhesive disposed on the pack surface covers less than 50 percent of the second surface of the second prismatic cell.

18. The battery-powered electronic device of claim 10, wherein the adhesive, when adhering the battery pack to the interior of the chassis, provides a peel strength of at least 8 N/cm.

19. The battery-powered electronic device of claim 10, wherein the adhesive, when adhering the battery pack to the interior of the chassis, provides an impact resistance of at least 0.80 Joules.

20. The battery pack of claim 1, wherein the first surface further comprises a first edge and a second edge opposed to the first edge of the first surface; and
the second surface further comprises a first edge and a second edge opposed to the first edge of the second surface,
wherein when the first surface and the second surface are arranged to form the L-shaped pack surface, the second edge of the first surface abuts at least a portion of the first edge of the second surface to form the junction between the first surface and the second surface.

21. The battery pack of claim 20, wherein the adhesive further comprises a first adhesive portion disposed on the first surface and a second adhesive portion disposed on the second surface, wherein the first adhesive portion extends from the first edge of the first surface toward the junction and the second adhesive portion extends from the second edge of the second surface toward the junction.

22. The battery-powered electronic device of claim 10, wherein the first surface further comprises a first edge and a second edge opposed to the first edge of the first surface; and
the second surface further comprises a first edge and a second edge opposed to the first edge of the second surface,
wherein when the first surface and the second surface are arranged to form the L-shaped pack surface, the second edge of the first surface abuts at least a portion of the first edge of the second surface to form the junction between the first surface and the second surface.

23. The battery-powered electronic device of claim 22, wherein the adhesive further comprises a first adhesive portion disposed on the first surface and a second adhesive portion disposed on the second surface, wherein the first adhesive portion extends from the first edge of the first surface toward the junction and the second adhesive portion extends from the second edge of the second surface toward the junction.

24. A method for manufacturing a battery pack, the method comprising:
providing a first prismatic cell comprising a first surface;
providing a second prismatic cell comprising a second surface;
electrically coupling and arranging the first prismatic cell and the second prismatic cell such that the first surface of the first prismatic cell and the second surface of the second prismatic cell form an L-shaped pack surface; and
disposing an adhesive on the L-shaped pack surface away from a junction between the first surface and the second surface, wherein the adhesive is configured to secure the first prismatic cell and the second prismatic cell directly to a chassis of a portable device.

\* \* \* \* \*